Dec. 7, 1954  A. HURST  2,696,141
BROW SUPPORT FOR SUNGLASSES OR THE LIKE
Filed Sept. 22, 1950

INVENTOR.
Alonzo Hurst
BY
Barlow & Barlow
Attorneys

United States Patent Office 2,696,141
Patented Dec. 7, 1954

2,696,141

BROW SUPPORT FOR SUNGLASSES OR THE LIKE

Alonzo Hurst, Providence, R. I.

Application September 22, 1950, Serial No. 186,165

1 Claim. (Cl. 88—43)

This invention relates to sun glasses of the type which have a brow support.

Considerable difficulty has been experienced in the positioning of a non-metallic cushion on the brow support which extends from the upper edge of one rim to the upper edge of the other in sun glasses, sun goggles and the like. Usually the non-metallic support is split in halves and assembled by cementing to completely encircle and embrace the metallic bar, or else the non-metallic cushion is first assembled on the bar and then the bar soldered in place.

In order to obviate either of these undesirable procedures, I have formed the non-metallic cushion in generally a C shape so that the same may be snapped over the bar it having sufficient elasticity to permit spreading and then contracting to hold the same in place on the bar. In some cases, the bar may be so exposed that ornamentation on the bar may be viewed after the cushion is assembled.

With these and other objects in view, the invention consists of certain novel features of construction, as will be more fully described and particularly pointed out in the appended claim.

In proceeding with this invention, I secure a metallic bar at its ends to the upper edges of each of the rims, and I provide a non-metallic cushion of celluloid or similar material in generally a C shape which has overhanging edges so that these edges may be spread apart to permit the bar to be inserted and will then spring back together again sufficiently so that the non-metallic cushion may be secured by its inherent resiliency on the bar.

With reference to the drawings, 10 designates one lens rim and 11 the other lens rim which have lenses 12 and 13 positioned therein. A bridge 14 connects these rims and each rim is provided with a nose pad 15 for engagement with the nose. Temples 16, 17 are secured to end pieces 18, 19 for mounting the rims on the face of the wearer.

Figure 1:
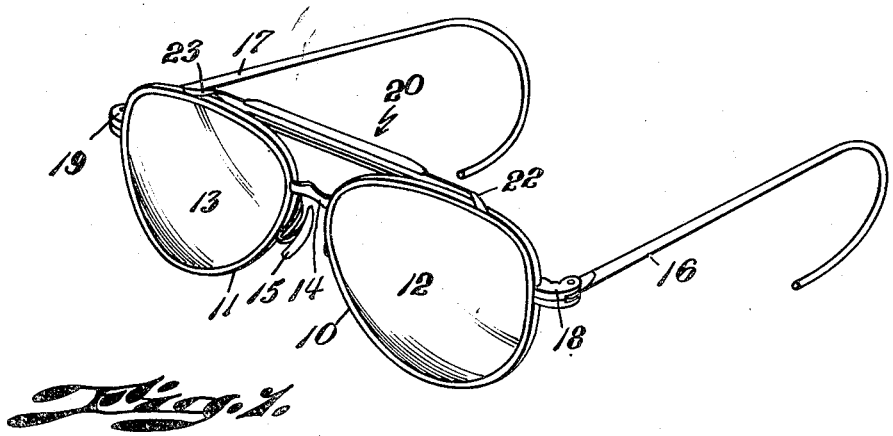
Figure 1 is a perspective view of a pair of sun glasses equipped with this invention.
Figure 2:
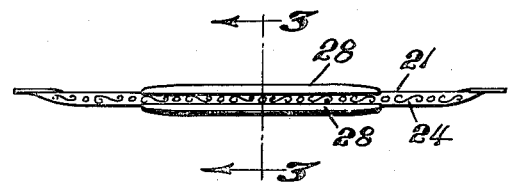
Figure 2 is a front view of the brow support alone.
Figure 3:
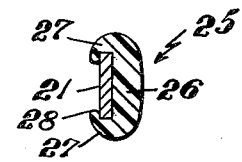
Figure 3 is a section on line 3—3 of Figure 2.
Figure 4:
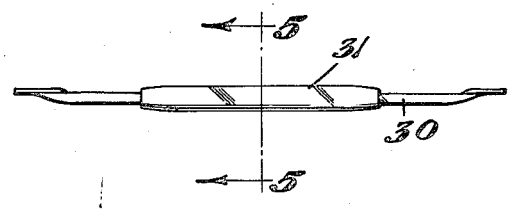
Figure 4 is a view similar to Figure 2 but showing a brow bar of modified structure.

The brow support, which is the subject of this invention, is designated general 20 and comprises a metallic bar 21 having its ends 22 and 23 secured to the upper edges of the rims 10 and 11 respectively. This brow bar is of a single piece of metal and of a suitable shape such, for instance, as rectangular in cross section, as seen in Figure 3, and may be ornamented on its front face as at 24, as shown in Figure 2. This brow support also includes a non-metallic cushion 25 (see Figure 3) which comprises a body portion 26 with edge portions 27 forming a generally C shape with its ends 28 so arranged as to overhang the front surface of the bar 21. This cushion will usually be of celluloid or some resin material and will be molded in the shape shown in Figure 3 so that it will snugly fit the bar 21 on which it is assembled.

To assemble this non-metallic cushion which forms a part of the support, it is merely necessary to spread the edges 28 and position it over the bar 21. The back portion or body thus becomes the cushion to rest against the brow and the overhanging portions 28 serve to secure it in place, they being spaced sufficiently so as to show the ornamentation 24 on the front of the bar, as may be more clearly seen in Figure 2.

Figure 5:
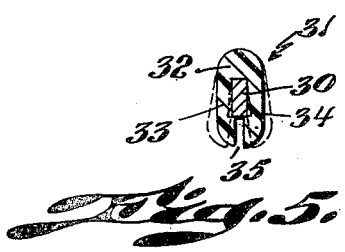
Figure 5 is a section on line 5—5 of Figure 4.

In some cases instead of having a non-metallic support, as just described, the metallic bar of the brow support may be shaped as shown at 30 in Figure 5 and the non-metallic cushion 31 may be shaped as shown in Figure 5 with the body portion 32 forming the upper edge of the support and split at the lower edge 35 to form legs 33 and 34 so that they may be spread to the dotted line position shown in Figure 5 for insertion of the bar 30 therein. This will also be a molded form having an inner shape generally rectangular to snugly receive the bar 30, and after snapped onto the bar, the legs will move together to hold the cushion against removal by its inherent elasticity.

I claim:

In sun glasses, a pair of lens rims, a bridge connecting said rims, a brow support above the bridge comprising a one-piece straight metallic bar of generally rectangular cross section and with the end portions thereof engaging the upper edges of said lens rims and secured thereto, said bar extending at the rear of said lens rims and having its rear surface generally parallel to the plane of the rims, a non-metallic one-piece cushion extending along one surface of said bar and along each adjacent face with portions hooking over the fourth face to hold it in position, the cushion being resilient to enable its hook ends to be spread for positioning over the bar and inherently elastic to return to a position embracing the bar, said cushion also being of uniform cross section throughout its length and of a length covering the major extent of said bar, the arrangement being such that the rear surface of the bar is completely covered.

References Cited in the file of this patent

UNITED STATES PATENTS

| Number | Name | Date |
|---|---|---|
| 1,001,734 | Day | Aug. 29, 1911 |
| 1,611,428 | Fensky | Dec. 21, 1926 |
| 1,910,456 | Baker | May 23, 1933 |
| 2,502,734 | Lyons | Apr. 4, 1950 |